United States Patent
Lauper et al.

(10) Patent No.: US 7,113,170 B2
(45) Date of Patent: Sep. 26, 2006

(54) METHOD AND TERMINAL FOR ENTERING INSTRUCTIONS

(75) Inventors: Eric Lauper, Bern (CH); Adriano Huber, Locarno (CH)

(73) Assignee: Swisscom Mobile AG, Bern (CH)

( * ) Notice: Subject to any disclaimer, the term of this patent is extended or adjusted under 35 U.S.C. 154(b) by 107 days.

(21) Appl. No.: 10/290,916

(22) Filed: Nov. 8, 2002

(65) Prior Publication Data

US 2003/0076300 A1  Apr. 24, 2003

Related U.S. Application Data

(63) Continuation of application No. PCT/CH00/00269, filed on May 16, 2000.

(51) Int. Cl.
*G09G 5/08* (2006.01)

(52) U.S. Cl. ........................ 345/158; 351/209; 715/863

(58) Field of Classification Search .................... 345/7, 345/8, 9, 156, 157, 158, 168, 700, 863; 351/209, 351/210, 211, 203; 382/103, 117, 115, 118; 715/863
See application file for complete search history.

(56) References Cited

U.S. PATENT DOCUMENTS

| | | | | |
|---|---|---|---|---|
| 4,595,990 A * | 6/1986 | Garwin et al. | ............... | 708/141 |
| 4,950,069 A * | 8/1990 | Hutchinson | .................. | 351/210 |
| 5,689,619 A * | 11/1997 | Smyth | .......... | 706/45 |
| 5,844,544 A | 12/1998 | Kahn et al. | | |
| 6,083,270 A * | 7/2000 | Scott | ............................ | 703/24 |
| 6,282,553 B1 * | 8/2001 | Flickner et al. | ............. | 345/156 |
| 6,456,262 B1 * | 9/2002 | Bell | ............................... | 345/8 |
| 6,577,329 B1 * | 6/2003 | Flickner et al. | ............. | 345/774 |
| 6,677,969 B1 * | 1/2004 | Hongo | ........................ | 345/863 |
| 6,712,468 B1 * | 3/2004 | Edwards | ...................... | 351/209 |
| 2002/0024500 A1 * | 2/2002 | Howard | ....................... | 345/158 |

FOREIGN PATENT DOCUMENTS

EP  0 677 801 A  10/1995

OTHER PUBLICATIONS

"Method For Access Control Via Gestural Verification", IBM Technical Disclosure Bulletin, US, IBM Corp. New York, Bd. 36, Nr. 9B, Sep. 1, 1993, Seiten.

* cited by examiner

*Primary Examiner*—Kent Chang
(74) *Attorney, Agent, or Firm*—Pearne & Gordon LLP

(57) ABSTRACT

Method with which users (1) enter instructions, in which said instructions are entered with sequences of voluntary movements of eye parts, the sequence required for entering a certain instruction being individual for each user.

31 Claims, 4 Drawing Sheets

METHOD AND TERMINAL FOR ENTERING INSTRUCTIONS

This application is a continuation of PCT application N° PCT/CH00/00269 filed May 16, 2000, the content of which is hereby incorporated.

FIELD OF THE INVENTION

The present invention concerns a method and a terminal for entering instructions, in particular for eye-controlled entering of instructions in a data processing system.

RELATED ART

Systems are already known that allow an apparatus to be controlled by the eye. Such systems are used among others whenever a hand control proves impossible or impracticable, or as an additional and fast input channel in order to control devices.

Document GB2281838 describes a device reacting to the user's blinking. A system for controlling the surroundings with the aid of the human eye is also described in the German utility model DE-U1-29610766. EP-A2-816984 describes a system that identifies the viewing direction on a screen in order to determine the image portions in which the viewer is interested.

U.S. Pat. No. 5,844,544 describes an eye-controlled device in which the user must follow a special protocol in order to select signs with the eyes. The device is calibrated to be adapted to each user. The protocol is the same for every user.

Eye movements are sometimes difficult to control; the eye also makes involuntary movements, among others saccades that under the circumstances could be interpreted as an instruction for the controlled device. These methods are therefore hardly suitable for entering security-critical instructions.

In many cases, the non-repudiation of the instruction is an important security criterion. It is important in particular during transaction operations that the transaction cannot subsequently be contested.

Furthermore, systems are known in which eye parameters are used as biometric keys to allow access to systems or services. It has among others been suggested to use the iris or retina motif to authenticate the viewer or even to identify him.

It is an aim of the invention to propose a new and improved method with which instructions can be entered with the eyes.

It is another aim of the invention to propose a new and improved system with which instructions are entered so that the intention of the person entering the instructions cannot be contested (non-repudiation).

It is another aim of the invention to propose a new and improved system with which instructions can be entered only by the authorized user.

BRIEF SUMMARY OF THE INVENTION

According to the present invention, these aims are achieved in particular through the characteristics of the independent claims. Further advantageous embodiments are moreover described in the dependent claims and in the description.

In particular, these aims are achieved in that instructions are entered with voluntary movements of eye parts, the sequence required for entering a certain instruction being individual for each user.

This has the advantage that instructions are entered not only with a simple eye movement that could be made involuntarily, but with a sequence of several movements of eye parts that can only be made voluntarily. Thus, the non-repudiation of the instruction is ensured. Since the sequence for entering an instruction is individual for each user, it can also be used to authenticate the user.

In this manner, it is also possible to enter security-critical instructions (for example instructions for electronic transactions) that cannot be contested and for which a reliable authentication of the user is important.

Apart from the inventive transaction method, the present invention relates in particular to a terminal and a server for performing the method.

DESCRIPTION OF THE DRAWINGS

Hereafter, an embodiment of the present invention will be described in more detail, with the aid of the attached figures, in which.

DETAILED DESCRIPTION OF THE INVENTION

Figure 1:
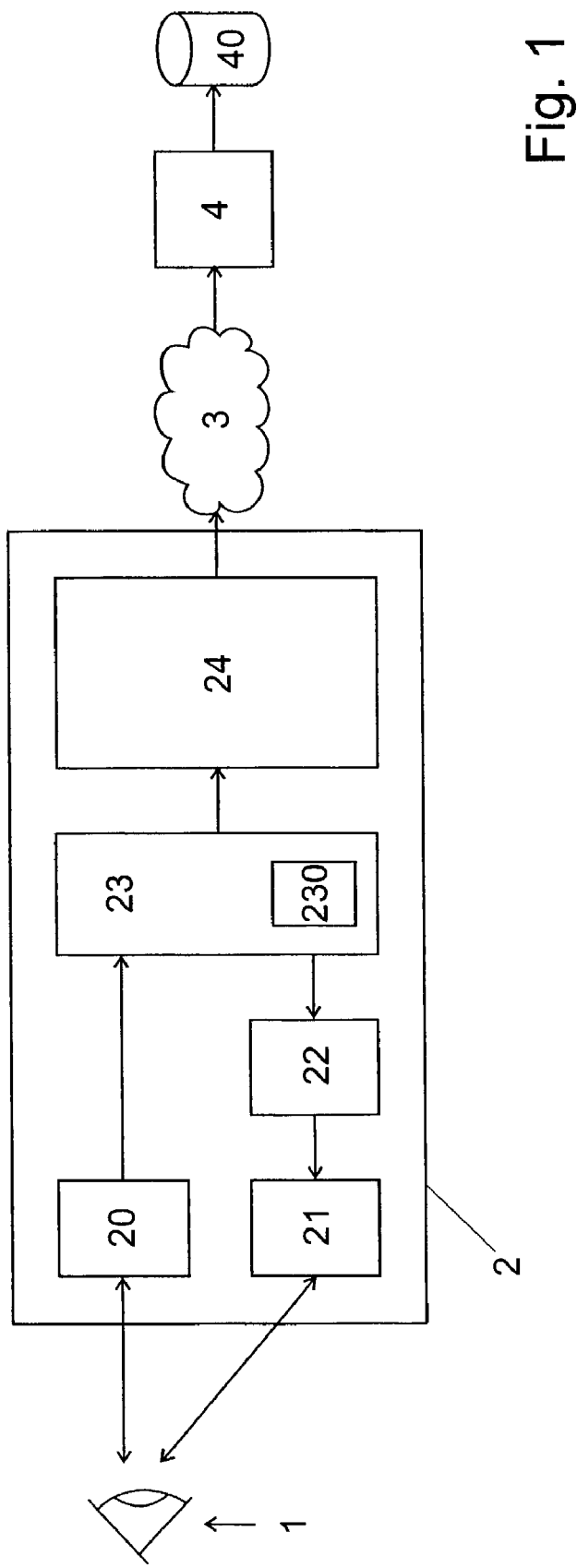
FIG. 1 shows a bloc diagram in which an inventive terminal and an inventive server connected with this terminal over a telecommunication network are illustrated diagrammatically.

In FIG. 1, the reference number 1 refers to the user of a terminal 2, with which instructions for a remote server 4 can be entered and sent over a communication network 3. The terminal 2 is preferably portable and can in a preferred embodiment consist of a mobile radio telephone, a palmtop, a laptop, a PDA (Personal Digital Assistant), a mobile assistant or of a combination of different interconnected components, the connection being achieved over a interface with contacts, for example according to PC-Card, or preferably over a contactless interface, for example according to IrDA or Bluetooth. In a preferred embodiment, the terminal contains a chip-card (not represented), for example a SIM (Subscriber Identification Module) card, in which user-specific data are stored.

The terminal comprises a module 20 for determining the movements of eye parts. The module 20 consists for example of an eye tracker that can determine the current viewing direction based on the position of the pupil and/or head of the user 1. Such eye-tracking modules have among others been described in patent application WO94/09472. In a variant embodiment, the module 20 can determine also other types of voluntary movements of eye parts, for example blinking, as described in the aforementioned patent application GB2281838, or focusing, etc. According to the embodiment, the movements of only one eye or of both eyes can be determined; in the latter case, it is also possible to determine squinting eye movements.

If a simple eye-tracking module is used that does not determine the head's position, the absolute viewing direction is not determined. In this case, differential eye movements are preferably recorded—for example upper left—upper right—middle—upper right.

In order for the terminal to react only to the movements of live creatures and not for example to be deceived by the presentation of animated images, body reactions are preferably determined by the module 20. In a preferred embodiment, a parameter dependent on the body temperature is measured, for example the reaction of the retina to a warming caused through the terminal 2. In another variant embodiment, the reaction of the iris to light variations caused through the terminal 2 are determined. In this manner it is possible to check whether the determined image of the eye really belongs to a human.

The terminal 2 further comprises image reproduction means 21 that can reproduce visible images for the user 1. In a first variant embodiment, the image reproducing means 21 consist of a conventional display, for example of a CRT liquid crystal display or plasma display. In a preferred embodiment, they consist of a so-called micro-display with an appropriate lens system, preferably of a VRD (Virtual Retinal Display) that projects the represented image directly onto the retina of one or both eyes of the user 1.

Virtual Retinal Displays have been described for example in patent applications WO94/09472, WO97/37339 and WO98/13720 and therefore no longer need to be described. The VRD device is controlled by a video controller 22 in order to project image signals corresponding to a two-dimensional or three-dimensional image onto the fovea of the user's eye.

The terminal 2 is controlled by data processing means 23, for example in the form of a processor 23 with a memory area (not represented). The processor 23 controls in particular the video controller 22 and processes the data from the module 20 for determining the movements of eye parts. A software and/or hardware module 230 in the processor 23 or connected with this processor is responsible for securing the data transmission with external devices 4, for example by establishing a secure communication channel, as will be explained later.

The one skilled in the art will understand that the data processing means 23 and the security module 230 can be made from a single chip or from a plurality of logically interconnected components. In a preferred embodiment, in which the terminal 2 consists of a mobile telephone, the data processing means 23 preferably comprise components in the mobile telephone as well as components in the removable chip-card (SIM card) that is connected with this mobile telephone. In a preferred embodiment, in particular the security-critical components used by the security module 230 are located in the chip-card.

The terminal further comprises a communication part 24 with which it can connect with a communication network 3. The communication part 24 preferably consists of a GSM or UMTS communication part, of a modem or of a contactless interface at close range, for example according to IrDA, Bluetooth, HomeRF or DECT.

The communication network 3 is for example a mobile radio network, for example according to GSM or UMTS, but could also be the internet or consist of several networks. The terminal can connect with a remote server 4 over the communication network 3, for example with a http or WAP server, that is administered by the operator of the communication network 3 and/or by a service provider. The data transmission between the terminal 2 and the remote server 4 is preferably secured end-to-end, for example with the protocol SSL (Secure Sockets Layer), TLS (Transport Layer Security) and/or WTLS (Wireless Transport Layer Security). Data sent from the terminal 2 to the server 4 are preferably signed electronically by the security module 230, preferably with an electronic private key stored in an electronic certificate in the SIM card or in the security module 230.

The terminal 2 preferably comprises additional data input means (not represented), for example a keyboard, a mouse, a scroll element, a microphone etc., with which the applications in the processor 23 can be controlled.

The user 1 can establish a session with the server 4 by entering the corresponding URL address or telephone number in his terminal 2. A session can for example be established in order to perform a transaction between the user 1 and the service provider that administers the server, for example in order to order and/or pay for a product or a service of the service provider 4.

During a session, image data of the server 4 (for example HTML pages or WAP cards with an image content) are generally transmitted to the terminal 2 and reproduced to the user 1. At least certain image data preferably contain GUI (Graphical User Interface) objects, for example hyperlinks, control boxes, radio buttons etc. that can be selected or activated by the user for entering a certain instruction, for example to load another page or confirm a transaction.

At least certain GUI objects can be selected or activated with the eyes for entering an instruction (for example by directing at least one eye during at least a predefined time in this direction). Preferably, a visual and/or acoustic feedback is given as soon as the object has been selected.

The service provider's remote server 4 comprises a user profile database 40, in which profile data are registered for each user. The stored profile data comprise for each user among others the user-specific sequences of eye movements.

Figure 2:
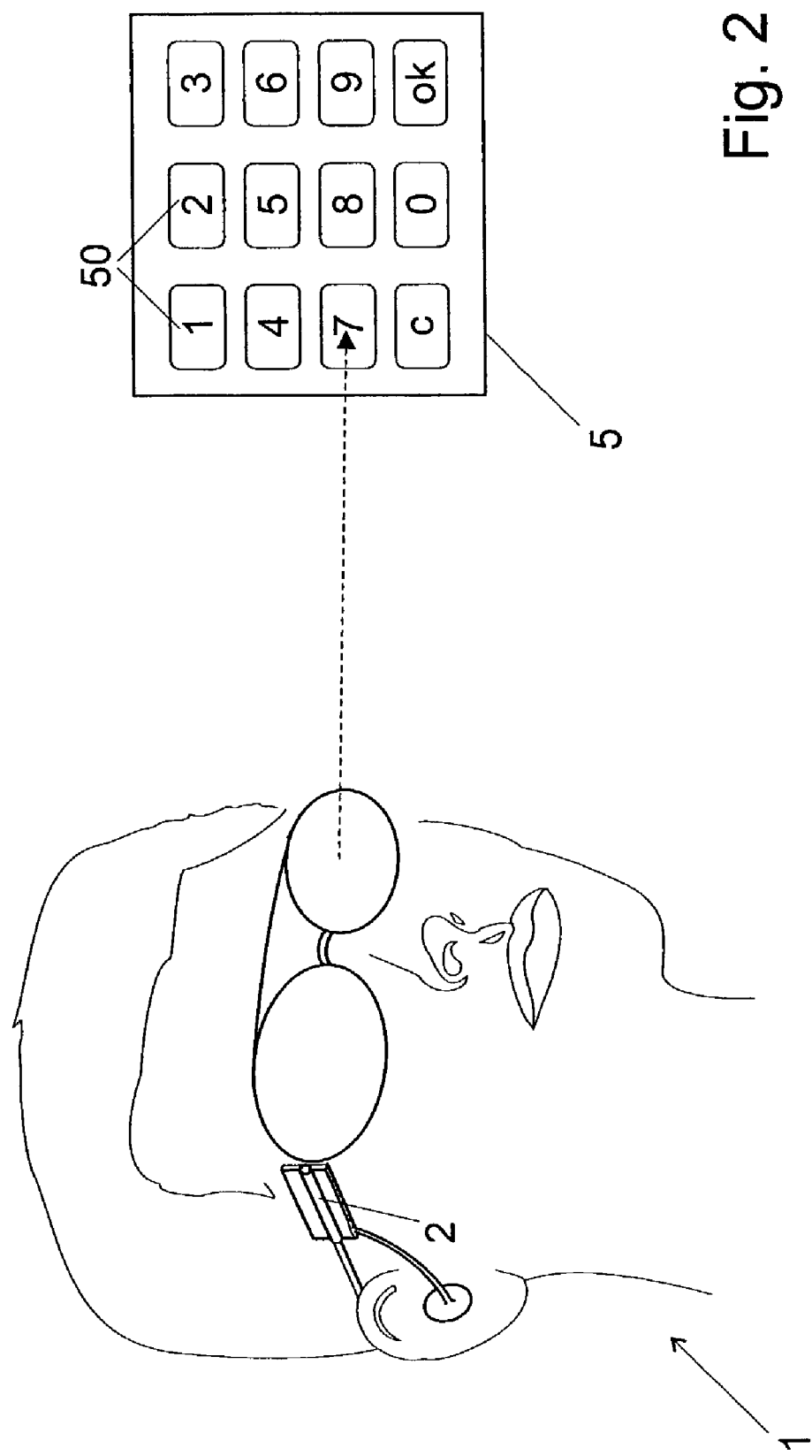
FIG. 2 shows an example of an image with a keyboard projected onto the user's retina.

FIG. 2 shows diagrammatically a user 1 with a variant embodiment of the terminal according to the invention, here integrated in a pair of glasses. The glasses contain a mobile radio part 24, a VRD display device 21 that can project images onto the retina of the user 1, and an eye-tracking system. The reference sign 5 shows the projected image. In the represented example, this image comprises a plurality of GUI objects 50 that here correspond to a virtual digital keyboard. A key "C" enables the correcting of entered data whilst the key "ok" enables the confirming.

According to the invention, at least certain instructions are entered with sequences of voluntary movements of eye parts, the sequences that are required for entering a certain instruction being individual for each user. In the represented example, certain instructions are entered through eye-controlled selection of a user-specific sequence of keys 50.

Figure 4:
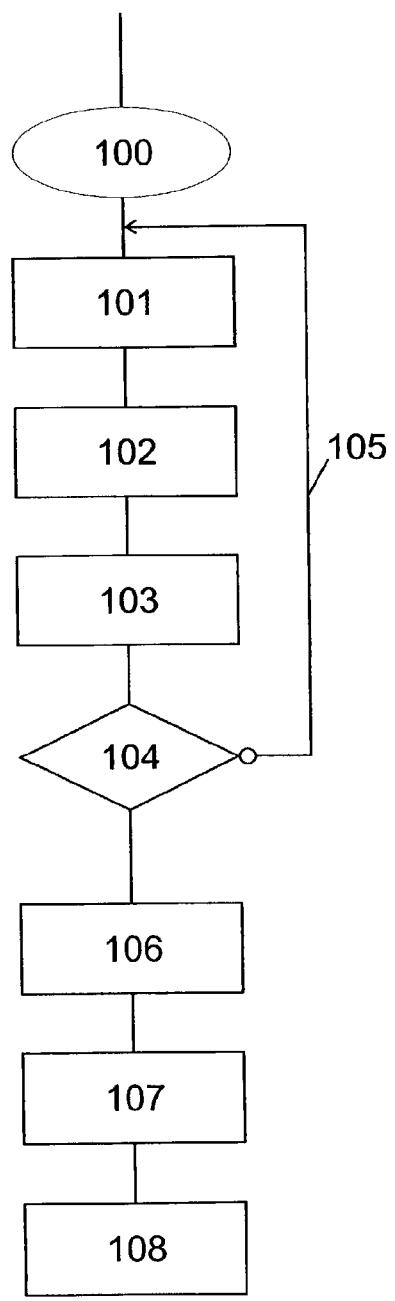
FIG. 4 shows a data flux diagram, in which the possible method steps for recording the sequence for an instruction in an embodiment of the invention is represented diagrammatically.

FIG. 4 shows a data flux diagram, in which the possible method steps for the recording 100 of the user-specific sequence for an instruction in the learning phase is represented. In a first step 101, the user selects the instruction that is to be entered with a sequence of eye movements. If several instructions can be encoded for a certain application, the desired instruction can be chosen for example from a list that is made available by the server 4.

In the step 102, the user enters the sequence of eye movements that are to be associated with the chosen instruction. The sequence can for example comprise the following types of movements of eye parts:

Predefined viewing directions, preferably in the direction of GUI objects, for example of virtual keys 50. In this manner, a digital code can be entered simply by viewing the corresponding keys.

Blinking movements of a certain eye or of both eyes.

Voluntary squinting eye movements.

Figure 3:
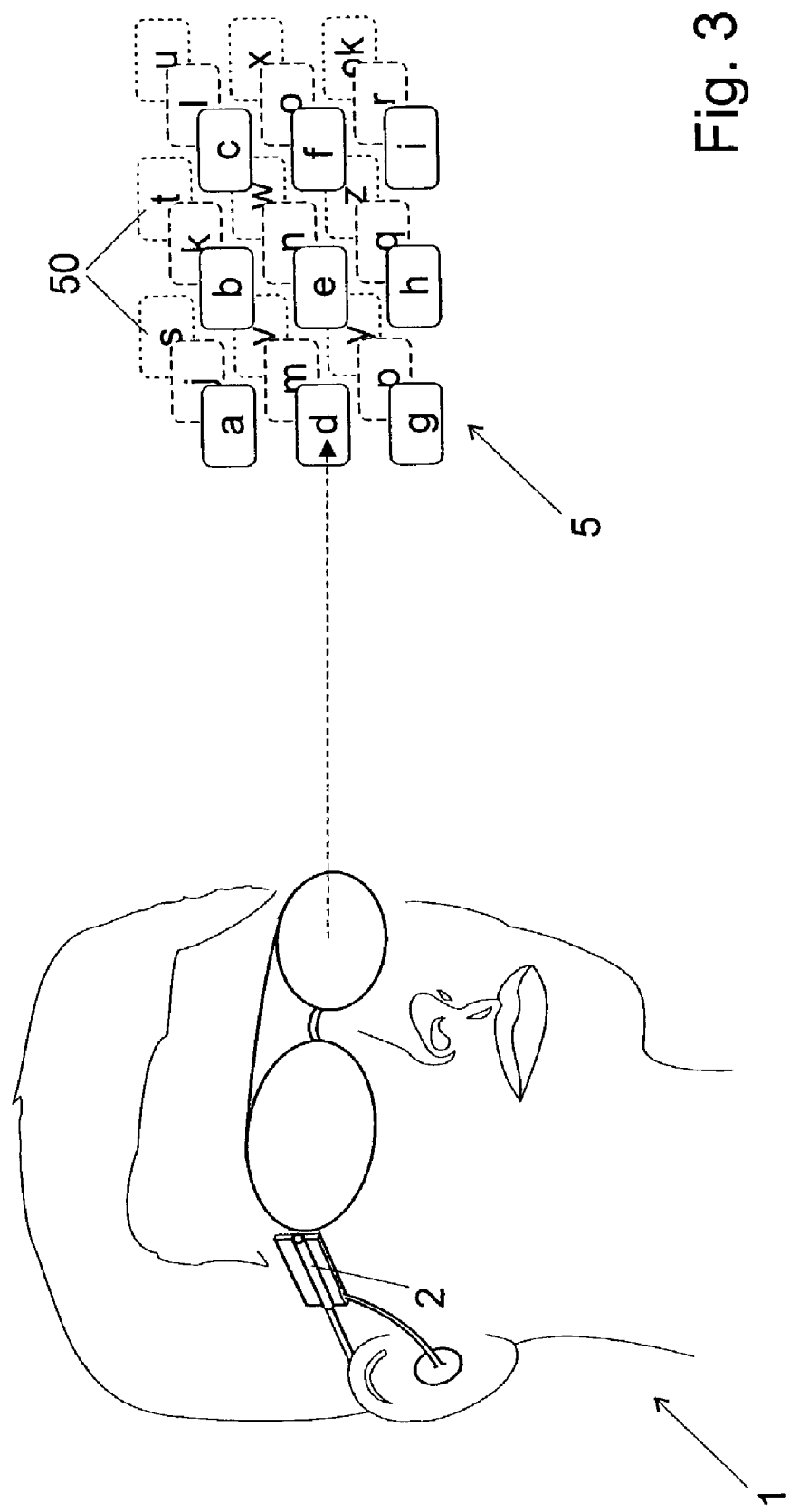
FIG. 3 shows an example of a three-dimensional image with a keyboard projected onto the user's retina.

Focussing of the eyes at a certain distance. It is thus for example possible to select different GUI objects at different distances. In FIG. 3, a three-dimensional virtual keyboard, that can be reproduced to the user, is represented by way of example; the user can select a key by adapting the viewing direction and the focussing.

Etc.

Every individual eye movement recognized as such is preferably confirmed during this learning phase by the processor 23. The end of the sequence is preferably determined by selecting the virtual key "ok" or by a special, predetermined eye movement. The entire sequence is preferably confirmed a second time (step 103) or as often as necessary until predefined criteria about the quality of repetition have been fulfilled.

In step 104, the confirmation is compared with the first sequence. If the two sequences are different, the user is invited to repeat the whole process (arrow 105). Depending on the security requirements, the user may be required to enter a minimal number of eye movements per sequence or at least two different types of eye movements. If, on the other hand, the sequence is accepted, it is encoded by the data processing means 23, for example simply as digital sequence, packed in a receipt that is preferably signed and encrypted through the security module 230 (step 106). In the method step 107, this receipt is transmitted through the communication network 3 and received and decrypted by the server 4 of the service provider. In the method step 108, the decrypted sequence is linked with the user 1 and with the selected instruction and stored in the user profile database 40.

In a variant embodiment, the recorded sequence can also be stored in the terminal 2 instead of in a remote server.

The signature in step 106 serves mainly the purpose of identifying the user 1 reliably. In a variant embodiment, the receipt is signed with the user's private electronic key; the server 4 has the corresponding public user key, with which the received signature can be verified. In another embodiment, the receipt is linked with biometric parameters of the user, for example with an image of the user's retina and/or iris (recorded with a retina image recording unit, not represented), that are also sent to the server 4 and with which the user's identity can be reliably verified. It is also possible to use both signature methods simultaneously.

As already mentioned, it is also possible to determine a parameter dependent on body temperature and to link it with the receipt in order to verify whether the terminal 2 is really used by a human and is not being deceived by a reproduced image sequence.

Figure 5:
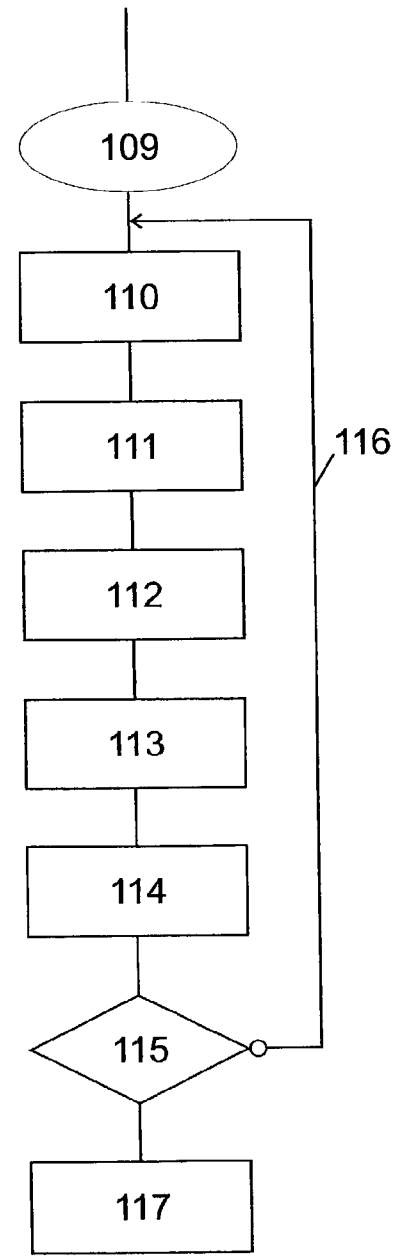
FIG. 5 shows a data flux diagram in which the possible method steps for entering an order in an embodiment of the invention is represented diagrammatically.

FIG. 5 shows a data flux diagram in which the possible method steps for the entering 109 of an instruction with a sequence of voluntary eye movements is represented. The sequence of the eye movements necessary for a certain instruction is entered in step 110 by the user 1 and confirmed in step 111, for example with a blink or any other special eye movement. The entered sequence is encoded in step 112, electronically signed and preferably encrypted through the security module 230, the signature possibly comprising also biometric characteristics of the user. The signed sequence is transmitted in step 113 through the communication network 3 to the remote server 4, where it is decrypted and where the signature is verified. If the signature is correct, verification is performed in the database 40 during step 114 as to whether the received sequence corresponds to a stored sequence of the user (matching).

If no instruction is found in the database that corresponds to the received sequence, the user 1 is invited in method step 115 to enter a new sequence (arrow 116). If on the other hand a match is found, the instruction defined by the user can be extracted from the database (step 117) and, according to the instruction or the embodiment, can be either executed by the server 4 or transmitted to the terminal 2.

In a variant embodiment, in which the sequence recorded during the learning phase is stored only in the terminal 2, the sequence entered in the use phase is compared with all the sequences stored in the terminal.

The one skilled in the art will understand that many different instructions can be entered according to the application. The inventive method is suitable in particular for entering secrets (for example passwords or PIN numbers). It is however also possible to enter with this method other instructions (among others transaction confirmations with "yes" or "no", or more complex requests that can also contain text and/or numerals as variables).

In the embodiment described, the sequence entered by the user is verified in the remote server 4 of a service provider. In a variant of the invention, the sequence of eye movements is verified in the terminal 2 or in the communication network 3. In this case, the individual verification sequence could be stored in the terminal 2 or preferably in the identification card in this terminal. It is also possible to enable the verification in the terminal 2 or in a remote server 4 with the same system depending on the application.

The invention claimed is:

1. A method for entering user instructions into a terminal, comprising the steps of:
    training the terminal, during a learning phase, by detecting a user-selected sequence of eye movements of the user to be associated with an instruction being individual for the specific user entering the user-selected sequence;
    associating said user-selected sequence of eye movements with said instruction, and
    entering said instruction when the sequence of eye movements is detected.

2. The method of claim 1, wherein said sequence comprises a plurality of viewing directions.

3. The method of claim 2, wherein an image is reproduced to said user and wherein said viewing directions correspond to predefined image parts.

4. The method of claim 3, wherein said image is three-dimensional.

5. The method of claim 3, wherein said image parts correspond to a virtual keyboard.

6. The method of claim 3, wherein said image is represented on a screen.

7. The method of claim 3, wherein said image is reproduced with a VRD device.

8. The method of claim 1, wherein said sequence comprises different focusing distances.

9. The method of claim 1, wherein said sequence comprises at least one blink.

10. The method of claim 1, wherein said sequence comprises at least one voluntary squinting eye movement.

11. The method of claim 1, wherein said sequence is converted to digital code.

12. The method of claim 11, wherein said digital code is signed electronically.

13. The method of claim 11, wherein said code is signed electronically with the user's private key.

14. The method of claim 11, wherein said code is signed with the user's biometric characteristics.

15. The method of claim 14, wherein said biometric characteristics of the user comprise eye characteristics.

16. The method of claim 15, wherein said biometric characteristics of the user comprise eye characteristics of eye parts of both eyes.

17. The method of claim 1, wherein a parameter dependent on the body temperature is measured and is linked with said sequence.

18. The method of claim 1, wherein a parameter dependent on the warming of the retina of the user is measured and linked with said sequence.

19. The method of claim 1, wherein the reaction of the iris of the user to light variations is measured and linked as parameter with said sequence.

20. The method of claim 1, wherein said sequence is determined through a portable terminal, said sequence being transmitted through a mobile radio part in said terminal over a mobile radio network to a remote server.

21. The method of claim 20, wherein said server is administered by a service provider and wherein the connection between said mobile radio part and said server is encrypted end-to-end.

22. The method of claim 21, wherein said sequence is compared in said server with a sequence stored by the user in advance, and wherein said instruction is only then carried out when the entered and the stored sequences correspond.

23. The method of claim 1, wherein a plurality of different individual sequences is provided for each user, each sequence corresponding to another instruction.

24. The method of claim 1, wherein said sequence is determined through a portable terminal and is compared with a sequence stored in said portable terminal.

25. the method of claim 1, wherein said method is practiced for a plurality of users, and wherein said user-selected sequences are unique for at least some of said plurality of users.

26. A terminal, comprising:
  means for learning a sequence of user-selected voluntary movements of eye parts of a person during a learning phase, wherein said voluntary eye movements are not in response to any predetermined pattern expected by the terminal;
  means for detecting said sequence of voluntary movements of eye parts,
  means for encoding and encrypting said sequences, and
  means for sending said encoded and encrypted sequences over a mobile radio network to a remote server.

27. A server in a communication network, comprising a database in which a plurality of individual sequences of voluntary movements of eye parts are stored, said individual sequences being obtained from a terminal, during a learning phase of said terminal, from a plurality of users, wherein each of said individual sequences is selected by the user not in response to any predetermined pattern expected by the server and corresponds to a certain instruction of a certain one of the plurality of users.

28. A method for entering user instructions into a terminal, comprising the steps of:
  training the terminal by detecting a user-selected sequence of eye movements of the user;
  associating said user-selected sequence of eye movements with a user selected one of a plurality of instructions; and
  when said sequence of eye movements is detected, entering the instruction associated with said detected sequence of eye movements.

29. The method of claim 28, further comprising the steps of:
  further training the terminal by detecting an additional one or more different user-selected sequences of eye movements;
  associating each one of said additional user-selected sequences of eye movements with a corresponding different one of said instructions; and
  when one of said sequences of eye movements is detected, entering the instruction associated with that detected sequence of eye movements.

30. The method according to claim 29, further comprising the step of providing a list of said plurality of instructions to the user prior to said associating.

31. The method according to claim 30, wherein said list is provided by a server, said method further comprising the step of sending the one of said instructions associated with the detected sequence of eye movements to the server.

* * * * *